(No Model.)
K. L. BREWSTER.
COLLAPSIBLE COVER SUPPORTING FRAME FOR DOUGH RECEPTACLES.
No. 499,510.  Patented June 13, 1893.
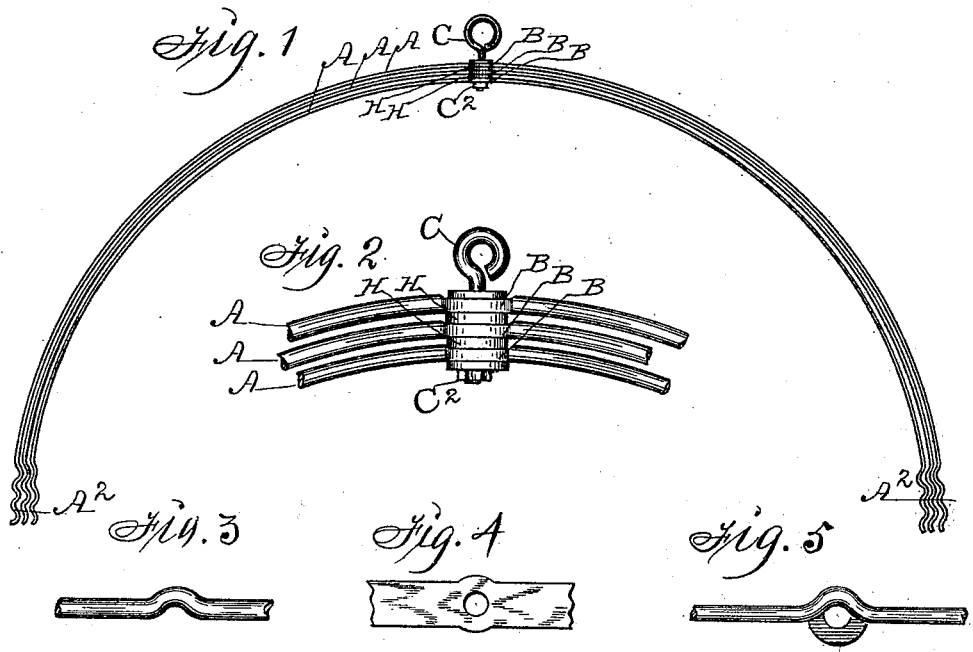
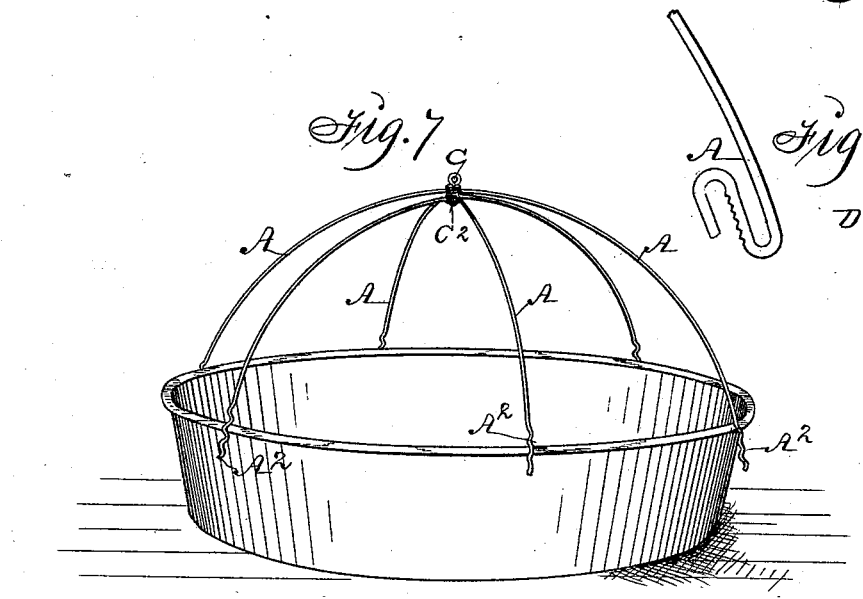
Witnesses:
M. P. Smith.
R. H. Orwig.
Inventor: Kate L. Brewster,
By Thomas G. Orwig, Atty.

UNITED STATES PATENT OFFICE.

KATE L. BREWSTER, OF KEARNEY, NEBRASKA.

COLLAPSIBLE COVER-SUPPORTING FRAME FOR DOUGH-RECEPTACLES.

SPECIFICATION forming part of Letters Patent No. 499,510, dated June 13, 1893.

Application filed December 14, 1891. Serial No. 414,904. (No model.)

*To all whom it may concern:*

Be it known that I, KATE L. BREWSTER, a citizen of the United States of America, residing at Kearney, in the county of Buffalo and State of Nebraska, have invented a new and useful Cover-Support for Dough-Receptacles, of which the following is a specification.

My object is to provide a simple, cheap and durable device adapted to be attached to the edge of a vessel containing leavened dough, or other substances required to be protected from the atmosphere, for the purpose of supporting a cloth covering placed over the dough and preventing it from coming in contact with the dough.

My invention consists in an article of manufacture adapted to be detachably attached to the top edge of an open-topped circular vessel to project upward in the form of a semi-spherical skeleton frame and also adapted to be folded into a semi-circle to economize space in packing and storing it away, when not in use, as illustrated in the accompanying drawings, in which—

Figure 1 shows the frame folded as desired when not in use. Fig. 2 is an enlarged detail view of the central part of Fig. 1. Figs. 3, 4, and 5 are enlarged detail plan views of different methods of providing an opening in the central portion of the wires for the purpose of admitting a bolt adapted to connect the said wires. Fig. 3 shows a perforated washer soldered to the wire; Fig. 4, a flat metal strip with a perforation for admitting a bolt. Fig. 5 shows a circular bend in the wire adapting it to admit a bolt. Fig. 6 shows a modification in the formation of the ends of a wire adapting it to engage the edge of a vessel not having a rim. Fig. 7 is a perspective view of the device applied to a circular pan having a rim around the top.

The reference letter A is used to designate spring wires of semi-circular shape and preferably formed as shown in Fig. 1. Their ends $A^2$ are adapted in shape to engage the top edge of a vessel and securely retained thereon by the resiliency of the spring wires. A perforation or eye B is formed in the center of each wire to admit a bolt.

C is an eyebolt of common form and $C^2$ is a nut on its end.

H are washers placed in concentric position relative to the eyes B and the bolt C extended through the eyes and washers. These washers are essential in keeping the wires separated so that they can be readily folded into concentric position relative to each other as shown in Fig. 1 and as required to economize space in packing and shipping and storing away the complete device when not in use. A flange or shoulder at the top of the bolt engages the upper wire and washer on the bolt, and a washer on the bolt below the lowest wire engages that lower wire so that when the nut $C^2$ is turned on the wires A and washers H will be clamped together as required to produce a rigid semi-spherical frame adapted to be attached to a bread pan as shown in Fig. 7. Relaxing the clamping force of the nut on the bolt allows the frame to be folded compactly as shown in Fig. 1.

What I claim as new, and desire to secure by Letters Patent, is—

A cover support for dough receptacles, comprising wires of semi-circular shape, each having an eye at its center and spring clasps at its ends adapted to fasten to the top edge of a bread pan, washers placed between the eyes at the centers of the wires and a screw bolt passed through the eyes and washers and a nut on the end of the bolt, arranged and combined to operate in the manner set forth.

KATE L. BREWSTER.

Witnesses:
R. M. RANKIN,
JNO. W. BREWSTER.